(12) United States Patent
Pinard et al.

(10) Patent No.: US 6,786,565 B2
(45) Date of Patent: Sep. 7, 2004

(54) INKJET PROOFING WITH MATCHED COLOR AND SCREEN RESOLUTION

(75) Inventors: Adam I. Pinard, Carlisle, MA (US); James M. Enge, Rochester, NY (US); Bradley S. Winslow, Nashua, NH (US); Andrew Masia, Newburyport, MA (US); Foster M. Fargo, Jr., Lincoln, MA (US)

(73) Assignee: Creo Americas, Inc., Billerica, MA (US)

( * ) Notice: Subject to any disclaimer, the term of this patent is extended or adjusted under 35 U.S.C. 154(b) by 0 days.

(21) Appl. No.: 09/962,808

(22) Filed: Sep. 24, 2001

(65) Prior Publication Data

US 2003/0058291 A1 Mar. 27, 2003

(51) Int. Cl.[7] .............................. B41J 2/205; B41J 2/21
(52) U.S. Cl. ........................................ 347/15; 347/43
(58) Field of Search ................ 347/43, 15, 6, 347/21, 23

(56) References Cited

U.S. PATENT DOCUMENTS

| | | | |
|---|---|---|---|
| 1,157,092 A | 10/1915 | Du Rell | |
| 1,924,038 A | 8/1933 | Herbsman et al. | |
| 3,261,593 A | 7/1966 | Sharples | 259/4 |
| 3,291,456 A | 12/1966 | Deane | 259/4 |
| 3,620,507 A | 11/1971 | Kruka | 259/4 |
| 3,647,295 A | 3/1972 | Dobouney | 355/38 |
| 3,798,656 A | 3/1974 | Lowy et al. | 346/1 |
| 4,123,800 A | 10/1978 | Mazzei | 366/150 |
| 4,196,437 A | 4/1980 | Hertz | 346/1.1 |
| 4,199,769 A | 4/1980 | Fischbeck | 346/140 |
| 4,270,576 A | 6/1981 | Takeda et al. | 137/888 |
| 4,285,367 A | 8/1981 | Nommensen | 137/888 |
| 4,337,032 A | 6/1982 | Duplouy et al. | 432/106 |

(List continued on next page.)

FOREIGN PATENT DOCUMENTS

| | | |
|---|---|---|
| EP | 0 533 593 A2/A3 B1 | 3/1993 |
| EP | 0556133 A2 | 8/1993 |
| EP | 0 642 924 A2 | 3/1995 |
| EP | 0 790 548 A1 | 8/1997 |
| EP | 0800309 A2 | 10/1997 |
| EP | 0 820 187 A2 A3 | 1/1998 |
| EP | 0 770 228 B1 | 11/1998 |
| EP | 1033256 A2 | 9/2000 |
| JP | 10-222658 | 8/1998 |
| WO | WO 96/26000 | 8/1996 |
| WO | WO 97/43122 | 11/1997 |
| WO | WO 01/17231 A1 | 3/2001 |

OTHER PUBLICATIONS

Coleman, Stan et al. "Prinergy 1.1 Solutions Guide" Document No.:75–0391C, Jul. 2000, CreoScitex.

"Color Proofing System, Product Bulletin" Document No. 75–0024A–D, Release Date: Jun. 16, 1997, Creo.

"Color Proofing System (CPS) User Guide" Creo Products, Inc., 1997, revised Sep. 14, 1999.

"Proofing with Spot Colors in Prinergy DRAFT Technical Bulletin" Document No.: 78–0059A, Release Date: Mar. 30, 2000, Heidelberg USA, Inc. and Creo Products, Inc.

*Primary Examiner*—Thinh Nguyen
(74) *Attorney, Agent, or Firm*—Kristofer E. Elbing

(57) ABSTRACT

One general aspect of the invention provides for creating half-tone ink-jet proofs on print-enhanced sheets based on an effective image cell pitch that substantially matches a cell pitch used to create press plates. Print process variables can be adjusted for the ink-jet proofing printer based on received color matching information. These adjustments can define preprint ink mixing ratios that allow at least some image cells to be printed with ink mixtures. Or they can define sub-area printing values that allow at least some dots to be printed with areas of different inks.

48 Claims, 9 Drawing Sheets

U.S. PATENT DOCUMENTS

| | | | | |
|---|---|---|---|---|
| 4,345,841 | A | 8/1982 | Day | 366/2 |
| 4,415,275 | A | 11/1983 | Dietrich | 366/165 |
| 4,486,102 | A | 12/1984 | Thiele et al. | 366/182 |
| 4,519,423 | A | 5/1985 | Ho et al. | 137/888 |
| 4,591,875 | A | 5/1986 | McCann | 346/75 |
| 4,607,261 | A | 8/1986 | McCann et al. | 346/75 |
| 4,614,953 | A | 9/1986 | Lapeyre | 346/140 |
| 4,633,909 | A | 1/1987 | Louboutin et al. | 137/88 |
| 4,662,759 | A | 5/1987 | Leibee et al. | 366/2 |
| 4,672,432 | A | 6/1987 | Sakurada et al. | 358/75 |
| 4,717,954 | A | 1/1988 | Fujita et al. | 358/80 |
| 4,734,711 | A | 3/1988 | Piatt et al. | 346/75 |
| 4,771,297 | A | 9/1988 | Lecheheb et al. | 346/140 |
| 4,809,015 | A | 2/1989 | Bowling et al. | 346/75 |
| 4,811,035 | A | 3/1989 | Huliba et al. | 346/75 |
| 4,814,788 | A | 3/1989 | Davies | 346/75 |
| 4,853,708 | A | 8/1989 | Walters | 346/75 |
| 4,860,787 | A | 8/1989 | Grosselin | 137/487.5 |
| 4,862,192 | A | 8/1989 | Slomianny | 346/75 |
| 4,875,055 | A | 10/1989 | McCann et al. | 346/75 |
| 4,879,565 | A | 11/1989 | Fujii | 346/75 |
| 4,924,301 | A | 5/1990 | Surbrook | |
| 5,029,107 | A | 7/1991 | Lee | 364/518 |
| 5,124,803 | A | 6/1992 | Troxel | 358/298 |
| 5,126,752 | A | 6/1992 | Weinberg | 346/1.1 |
| 5,278,678 | A | 1/1994 | Harrington | 358/518 |
| 5,293,539 | A | 3/1994 | Spence | 358/527 |
| 5,296,947 | A | 3/1994 | Bowers | 358/527 |
| 5,309,246 | A | 5/1994 | Barry et al. | 358/298 |
| 5,342,821 | A | 8/1994 | Pearce | 503/227 |
| 5,380,164 | A | 1/1995 | Fry et al. | 417/250 |
| 5,394,177 | A | 2/1995 | McCann et al. | 347/7 |
| 5,424,766 | A | 6/1995 | Anderson | 347/7 |
| 5,450,111 | A | 9/1995 | Mutoh | 347/78 |
| 5,455,614 | A | 10/1995 | Rhodes | 347/74 |
| 5,459,497 | A | 10/1995 | Manning et al. | 347/6 |
| 5,463,471 | A | 10/1995 | Chou | 358/298 |
| 5,473,439 | A | 12/1995 | Pappas | 358/298 |
| 5,483,625 | A | 1/1996 | Robertson et al. | 395/117 |
| 5,526,026 | A | | 6/1996 | Bowers | 347/6 |
| 5,550,647 | A | | 8/1996 | Koike | 358/462 |
| 5,553,171 | A | | 9/1996 | Lin et al. | 382/299 |
| 5,572,632 | A | | 11/1996 | Laumeyer et al. | 395/116 |
| 5,633,990 | A | | 5/1997 | Housel | 395/109 |
| 5,640,254 | A | | 6/1997 | Sexton | 358/536 |
| 5,646,656 | A | | 7/1997 | Leonhardt et al. | 347/43 |
| 5,671,340 | A | | 9/1997 | Chapman et al. | 395/101 |
| 5,682,191 | A | | 10/1997 | Barrett et al. | 347/104 |
| 5,685,639 | A | | 11/1997 | Green | 366/101 |
| 5,687,300 | A | | 11/1997 | Cooper | 395/109 |
| 5,688,046 | A | | 11/1997 | Triassi et al. | 366/152.2 |
| 5,696,612 | A | | 12/1997 | Thornton | 358/534 |
| 5,696,889 | A | | 12/1997 | Morikawa | 395/109 |
| 5,705,060 | A | | 1/1998 | Robberts | 210/198.1 |
| 5,729,664 | A | | 3/1998 | Ishikawa | 395/109 |
| 5,734,484 | A | | 3/1998 | Yamamoto et al. | 358/500 |
| 5,734,801 | A | | 3/1998 | Noguchi et al. | 395/109 |
| 5,748,858 | A | | 5/1998 | Ohtsuka et al. | 395/109 |
| 5,751,433 | A | | 5/1998 | Narendranath et al. | 358/298 |
| 5,751,434 | A | | 5/1998 | Narendranath et al. | 358/298 |
| 5,781,709 | A | | 7/1998 | Usami et al. | 395/109 |
| 5,786,907 | A | | 7/1998 | Lotspiech | 358/518 |
| 5,805,734 | A | | 9/1998 | Ebner | 382/237 |
| 5,806,430 | A | | 9/1998 | Rodi | 101/484 |
| 5,825,986 | A | | 10/1998 | Ferguson | 395/109 |
| 5,838,333 | A | | 11/1998 | Matsuo | 345/431 |
| 5,844,688 | A | | 12/1998 | Shimizu et al. | 358/296 |
| 5,845,056 | A | | 12/1998 | Kohler et al. | 395/109 |
| 5,854,883 | A | | 12/1998 | Madeley | 395/109 |
| 5,855,433 | A | | 1/1999 | Velho et al. | 382/162 |
| 5,978,555 | A | | 11/1999 | Inoue | 395/109 |
| 6,026,216 | A | | 2/2000 | Ohtsuka et al. | 395/109 |
| 6,052,195 | A | * | 4/2000 | Mestha et al. | 356/425 |
| 6,060,208 | A | | 5/2000 | Wang | 430/201 |
| 6,072,592 | A | | 6/2000 | Ashworth | 358/1.9 |
| 6,075,614 | A | | 6/2000 | Ohtsuka | 358/1.1 |
| 6,096,472 | A | | 8/2000 | Niemeyer | 430/201 |
| 6,099,113 | A | | 8/2000 | Blouin et al. | 347/85 |

\* cited by examiner

INKJET PROOFING WITH MATCHED COLOR AND SCREEN RESOLUTION

FIELD OF THE INVENTION

This invention relates to apparatus and methods for creating proofs of documents to be printed on printing presses.

BACKGROUND OF THE INVENTION

Conventional halftoning is an amplitude modulated process in which continuous shading is simulated by varying the size of equally-spaced printed dots. The resolution at which the dots are placed is called the line screen ruling. The dots are typically oriented at an angle with respect to the print substrate, and this angle is called the screen angle. In grayscale images, the screen angle is typically 45°, which makes the resulting halftone pattern less noticeable to the human eye. For color images, each of the primary colors (usually cyan, magenta, yellow, and black—CMYK) are printed at different screen angles in order to minimize color shifts due to misregistration during the printing process. The angles are carefully selected for each color in order to minimize the occurrence of interference patterns called Moire (typical screen angles are C=15°, M=75°, Y=0°, K=45°).

Proofing is the process of generating a sample print, which represents the output that can be expected from a printing press. Proofing printers ("proofers") are relatively inexpensive printers that strive to accurately represent the press output, including its color and quality. Color management for proofing devices is very important, because such devices generally use different color inks or donors than do the printing presses (proofer CMYK≠press CMYK). And even if a proofing device were to use the same color primaries as a particular press, such a device may not be usable with other presses. This is because not all of them use primary inks with the same hues, with American and European presses exhibiting significant differences in this area. Proofers may also need to match specialty or "spot" colors, which are essentially $5^{th}$ or $6^{th}$ colors used by the press for colors that the press's primary colors cannot reproduce well or at all.

In order to produce a color match on the proofer, the image data is typically color corrected before halftone processing. This process results in different data sets being halftone processed for the proofer and the press. Even if the same halftoning technique is used for both machines, the resulting halftone pattern for the two devices will be slightly different in order to make up for the color mismatch.

Some proofing devices focus on matching the color of the press, but appear not to be completely accepted because they use different halftoning techniques than the press. The feeling is that proofs from these devices cannot be used to predict the Moiré that can be expected on the press. Other proofing devices focus on matching the halftoning technique of the press as exactly as possible, but tend not to produce a good color match.

SUMMARY OF THE INVENTION

One general aspect of the invention provides for creating half-tone ink-jet proofs on print-enhanced sheets based on an effective image cell pitch of at least about 2400 image cells per inch that substantially matches a cell pitch used to create press plates. This approach has apparently never been tried by the engineers, technicians, and executives employed in the 15 year history of the dedicated digital inkjet contract proofing industry, despite the active participation of around 15 companies, including several large multinational corporations. This manner of thinking appears to result at least in part from a consistent and longstanding focus in the industry on the use of a single ink color set to match different press color sets and spot colors.

In preferred embodiments, print process variables can be adjusted for the ink-jet proofing printer based on received color matching information. These adjustments can define preprint ink mixing ratios that allow at least some image cells to be printed with ink mixtures. Or they can define sub-area printing values that allow at least some dots to be printed with areas of different inks.

Systems according to the invention can exhibit substantial advantages over other existing proofing techniques, including analog proofing techniques, press-specific proofing techniques, and laser deposition proofing techniques. Specifically, while analog proofs can be of high quality, they are cumbersome and expensive to produce. They are also incompatible with the increasingly common all-digital, direct-to-plate approach that the industry is steadily adopting.

Systems according to the invention also exhibit advantages over press-specific proofing techniques because press-specific proofers tend to be expensive and lack versatility. While proofers that match the exact process used on the press can produce high quality proofs, the process they are matching is typically optimized for large-scale printing. Press-specific proofers therefore tend to be more complex and more costly to run on a sheet-by-sheet basis. They also cannot generally be used to produce accurate proofs for presses that use other processes. And "dual-use" presses that include proofing capabilities generally cannot produce proofs without tying up their expensive high volume press capabilities, and cannot produce them at all during their long, high-volume runs.

Systems according to the invention exhibit advantages over laser deposition techniques because such techniques employ expensive proofers and rely on donor sheets that are bulky, expensive, and can be cumbersome to load, ship, and store. In addition, only a relatively small number of colors of donor sheets are currently available, even though this technique has been around for some time. And while print shops could produce their own sheets for particular requirements, this adds further complexity and expense to an already relatively cumbersome and expensive technique.

Generally, this aspect of the invention provides for a method of printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch. The method includes receiving print data that describes half-tone dots having a predetermined perimeter using image cells at substantially the same horizontal image cell pitch and substantially the same vertical image cell pitch that is used by the setter to create the plates for the reference printer for the four or more colors. A proofing sheet is received including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment. A half-tone proof is made for the four or more colors with an inkjet proofer on at least the first face of the proofing sheet at substantially the same horizontal cell pitch as the effective horizontal cell pitch of the data received in the step of receiving and at substantially the same vertical cell pitch as the effective vertical cell pitch of the data received in the step of receiving.

In preferred embodiments, color matching information can be received for the ink set to be used by the reference printer to print the document, print process variables can be adjusted for the inkjet proofing printer based on the color matching information received in the step of receiving, and printing can occur according to these process variables. The step of adjusting can define preprint ink mixing ratios, with the step of printing printing at least some of the image cells with ink mixtures. The step of adjusting can define sub-area printing values, with the step of printing printing at least some of the dots with a plurality of areas of different inks. The step of adjusting can define sub-area printing values, with the step of printing printing at least some of the dots with at least one overlapping ink area. The step of adjusting can define sub-area printing values, and with the step of printing printing at least some inked dots with at least one blank area within their perimeters. The step of printing can employ the same electronic print representation used by the setter. The setter can be a direct-to-plate plate setter that produces the plates directly, with the electronic print representation being an electronic print representation readable by the plate setter. The setter can be a reduced format film setter that produces scaled films at a scaled resolution that when enlarged to produce the plates produces plates that are based on the effective resolution, with the electronic print representation being an electronic print representation readable by the film setter. The step of printing can print one image cell for each of substantially all of the image cells in the data received in the step of receiving on a print substrate for at least one of the plates. The second face can have properties resulting from the deposited ink drop print-enhancing treatment. The step of proofing can employ a proofing sheet that is a B-size or larger sheet. The step of proofing can employ a proofing sheet that is a 4-up or larger sheet. The step of making a proof can employ a continuous inkjet printing technique or a drop-on-demand printing technique. The step of making a proof can employ dye-based inks. The step of proofing can employ software, ink, and media having tolerances that produce an effective color range of $4\Delta e$ in CIE color space. The step of receiving a proofing sheet can receive a proofing sheet with the second face also having properties resulting from a deposited ink drop print-enhancing treatment, with the step of making a half-tone proof further making a half-tone proof on the second face of the proofing sheet at substantially the same horizontal cell pitch as the effective horizontal cell pitch of the data received in the step of receiving and at substantially the same vertical cell pitch as the effective vertical cell pitch of the data received in the step of receiving.

In another general aspect, the invention features an inkjet proofer for printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch. The proofer includes storage for print data that describes half-tone dots having a predetermined perimeter using image cells at substantially the same horizontal image cell pitch and substantially the same vertical image cell pitch that is used by the setter to create the plates for the reference printer for the four or more colors. A feed mechanism is provided for receiving a proofing sheet including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment. The proofer also includes logic responsive to the storage for generating a half-tone proof for the four or more colors with an inkjet proofer on at least the first face of the proofing sheet received by the feed mechanism at substantially the same horizontal cell pitch as the effective horizontal cell pitch of the data received in the step of receiving and at substantially the same vertical cell pitch as the effective vertical cell pitch of the data received in the step of receiving.

In a further general aspect, the invention features an inkjet proofer for printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch. The proofer includes means for storing print data that describes half-tone dots having a predetermined perimeter using image cells at substantially the same horizontal image cell pitch and substantially the same vertical image cell pitch that is used by the setter to create the plates for the reference printer for the four or more colors.

Also provided are means for receiving a proofing sheet including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment. The proofer further includes means responsive to the means for storing for generating a half-tone proof for the four or more colors with an inkjet proofer on at least the first face of the proofing sheet received by the means for receiving at substantially the same horizontal cell pitch as the effective horizontal cell pitch of the data received in the step of receiving and at substantially the same vertical cell pitch as the effective vertical cell pitch of the data received in the step of receiving.

In another general aspect, the invention features a proof generation method for proof printers that includes the step of receiving print data to be printed on a target halftone printing press to which a first halftoning technique has been applied, wherein the first halftoning technique is at least comparable to a target halftoning technique used by the target halftone printing press, applying a second halftoning technique to the print data, wherein the first and second halftoning techniques are different, and providing the data to a proofing printer different from the target halftone printing press.

In preferred embodiments, the step of applying a first halftoning technique can apply a half-toning technique that employs constantly spaced dots of variable sizes with the step of applying a second halftoning technique applying a stochastic halftoning technique to the constantly spaced dots of variable sizes. The print data can be color print data including a plurality of color-separated data subsets, with the step of applying a first halftoning technique and the step of applying a second halftoning technique being applied to the data subsets. The step of applying a first halftoning technique can employ dots from a first set of primary colors, with the step of applying a second halftoning technique adding at least a second of the primary colors to a portion of one or more of the dots assigned to a first of the primary colors based on the first halftoning technique. The step of applying a first halftoning technique can employ dots from a first set of primary colors with the step of applying a second halftoning technique adding at least a first additional color to a portion of one or more of the dots assigned to a first of the primary colors based on the first halftoning technique. The step of applying a first halftoning technique can employ dots from a first set of primary colors, with the step of applying a second halftoning technique adding at least a first additional color to a portion of one or more of the dots assigned to a first of the primary colors based on the first halftoning technique. The method can further include the steps of receiving a target printing press selection command and selecting parameters for the second halftoning technique based on the target printing press selection command. The step of applying a first halftoning technique and the step of applying a second halftoning technique can be applied as part of a single simultaneous process. The method can further include the step of printing the data with an ink-jet proofing printer different from the target halftone printing press. The step of applying a first halftoning technique can employ dots, with the step of applying a second halftoning technique resulting in lightening colorant values for at least some areas of at least some of the dots from the first halftoning technique. The step of applying a first halftoning technique can employ dots, with the step of applying a second halftoning technique causing the complete lightening of colorant values for at least some areas of at least some of the dots from the first halftoning technique. The step of applying a first halftoning technique can employ dots, with the step of applying a second halftoning technique causing the substitution of colorant from at least some areas of at least some of the dots from the first halftoning technique with a different colorant. The step of applying a first halftoning technique can employ dots, with the step of applying a second halftoning technique causing the overlaying of a different colorant on at least some areas of at least some of the dots from the first halftoning technique. The step of applying a first halftoning technique can employ dots, with the step of applying a second halftoning technique causing the creation of a plurality of areas of a same color within at least some of the dots from the first halftoning technique. The step of applying a first halftoning technique can employ dots, with the step of applying a second halftoning technique causing the creation of a plurality of areas as individual pixels. The step of applying a first halftoning technique can employ dots, with the step of applying being applied to the dots corresponding to a spot color defined by the print data to match the spot color. The print data can be based on a first set of complementary subtractive colorants, with the proofing printer being an ink set based on a second set of complementary subtractive colorants that includes the same qualitative colors as the first set, but wherein at least one of the colorants in the first set exhibits some degree of mismatch with respect to a corresponding one of the colorants in the second set. The first and second sets can both be based on cyan, magenta, and yellow. The second set can be based on cyan and magenta that both have a hue chosen such that they will substantially always require yellow contamination. The proofing printer can be an ink-jet based proofing printer. The print data can be provided to the target halftone printing press. Changes can be made in the print data based on examination of a proof from the proofing printer before printing it on the target press.

In a further general aspect, the invention features a proof generation apparatus for proof printers that includes a print data input responsive to a first halftone processor employing a first halftone technique, wherein the first halftoning technique is at least comparable to a target halftoning technique used by the target halftone printing press. A second halftone processor employs a second halftone technique, with the first and second halftoning techniques being different. The apparatus further includes a processed print data output.

In another general aspect, the invention features a proof generation apparatus for proof printers that includes means for receiving print data to be printed on a target halftone printing press from means for applying a first halftoning technique to the print data, wherein the first halftoning technique is at least comparable to a target halftoning technique used by the target halftone printing press, means for applying a second halftoning technique to the print data, wherein the first and second halftoning techniques are different, and means for providing the data to a proofing printer different from the target halftone printing press.

In a further general aspect, the invention features a proof generation method for ink jet proof printers that includes receiving print data to be printed on a target halftone printing press to which a first halftoning technique has been applied to obtain screen image data representing a plurality of screen dots, which yield a shaded visual representation of the image when printed on a printing press, creating one or more lightened areas where direct deposition of colorant is to be lightened within at least some of the screen dots to be printed but where indirect deposition colorant from overlapping areas is to remain, wherein the method is optimized to accurately reproduce the shaded visual image that would be printed on the printing press, and providing the data to an inkjet proofing printer different from the target halftone printing press and capable of printing the overlapping areas.

In preferred embodiments, the method can include a step of receiving an adjustment signal and a step of adjusting parameters of the step of lightening in response to the step of receiving a user adjustment signal. The method can include the step of printing the data with overlapping dots for the overlapping raster pattern using an ink-jet proofing printer different from the target halftone printing press. The step of creating can create the lightened areas as individual pixels. The steps of creating and providing can be adapted to produce complete overlap of the lightened areas.

In another general aspect, the invention features proof generation apparatus for ink jet proof printers that includes a print data input responsive to a series of screen dots from first halftone processor employing a first halftoning technique, wherein the plurality of dots yield a shaded visual representation of the image when printed on a printing press, lightening logic for creating one or more lightened areas where direct deposition of colorant is to be lightened within at least some of the screen dots to be printed but where indirect deposition colorant from overlapping areas is to remain, and wherein the apparatus is optimized to accurately reproduce a shaded visual image that would be printed on the printing press, and a processed print data output for providing the data to an ink-jet proofing printer different from the target halftone printing press and capable of printing the overlapping areas.

In a further general aspect, the invention features proof generation apparatus for ink jet proof printers that includes means for receiving print data to be printed on a target halftone printing press to which a first halftoning technique has been applied to obtain screen image data representing a plurality of screen dots, which yield a shaded visual representation of the image when printed on a printing press, means for creating one or more lightened areas where direct deposition of colorant is to be lightened within at least some of the screen dots to be printed but where indirect deposition colorant from overlapping areas is to remain, wherein the apparatus is optimized to accurately reproduce the shaded visual image that would be printed on the printing press, and means for providing the data to an ink-jet proofing printer different from the target halftone printing press and capable of printing the overlapping areas.

In another general aspect, the invention features a proof generation method for ink jet proof printers that includes receiving print data to be printed on a target halftone printing press to which a first halftoning technique has been applied, wherein the first halftoning technique is at least comparable to a target halftoning technique used by the target halftone printing press, lightening at least one portion of each of at least some of the screen dots, adding at least one region of a second color in some of the screen dots, and providing the screen image data to a proofing printer different from the target halftone printing press.

In preferred embodiments, the step of applying a first halftoning technique, the step of lightening, and the step of adding can be applied as part of a single simultaneous process before the step of providing. The method can further include the step of printing the data with an ink-jet proofing printer different from the target halftone printing press. The step of applying a first halftoning technique can employ dots, with the step of applying a second halftoning technique causing the complete lightening of colorant values for at least some areas of at least some of the dots from the first halftoning technique. The step of applying a first halftoning technique can employ dots, with the step of applying a second halftoning technique causing the overlaying of colorant from at least some areas of at least some of the dots from the first halftoning technique with a different colorant. The step of applying a first halftoning technique can employ dots, with the step of applying a second halftoning technique causing the creation of a plurality of areas of a same color within at least some of the dots from the first halftoning technique.

In a further general aspect, the invention features proof generation apparatus for proof printers that includes a print data input responsive to a first halftone processor employing a first halftone technique, wherein the first halftoning technique is at least comparable to a target halftoning technique used by the target halftone printing press, lightening logic for lightening at least one portion of each of at least some of the screen dots, an adder for adding at least one region of a second color in some of the screen dots, and a processed print data output.

In another general aspect, the invention features proof generation apparatus for proof printers that includes means for receiving print data to be printed on a target halftone printing press to which a first halftoning technique has been applied, wherein the first halftoning technique is at least comparable to a target halftoning technique used by the target halftone printing press, means for lightening at least one portion of each of at least some of the screen dots, means for adding at least one region of a second color in some of the screen dots, and means for providing the screen image data to a proofing printer different from the target halftone printing press.

In a further general aspect, the invention features a proof generation method for proof printers that includes receiving print data to be printed on a target halftone printing press to which a first halftoning technique has been applied, wherein the first halftoning technique produces a plurality of dots and is at least comparable to a target halftoning technique used by the target halftone printing press, altering at least a plurality of areas distributed within at least some of the dots with substantially the same color alteration, and providing the data to a proofing printer different from the target halftone printing press.

In preferred embodiments, the step of altering can alter the areas to include a same color that is different from the color of the dot. The step of altering can operate according to a set of primary colors that is adjusted to increase the altering of at least a first color by a second color in favor of a decrease in the altering of the first color by a third color that is darker than the second color. The step of altering can alter the areas to lighten the color of the dot. The step of altering can alter dots corresponding to a spot color defined by the print data to match the spot color. The data can be printed with an ink-jet proofing printer different from the target halftone printing press. The print data can be based on a first set of complementary subtractive colorants, with the proofing printer having an ink set based on a second set of complementary subtractive colorants that includes the same qualitative colors as the first set, but wherein at least one of the colorants in the first set exhibits some degree of mismatch with respect to a corresponding one of the colorants in the second set. The first and second sets can both be based on cyan, magenta, and yellow. The second set can be based on cyan and magenta that both have a hue chosen such that they will substantially always require yellow contamination. The proofing printer can be an ink-jet based proofing printer. The print data can be provided to the target halftone printing press. The method can further include the step of making changes in the print data based on examination of a proof from the proofing printer before printing it on the target press.

In another general aspect, the invention features a proof generation apparatus for proof printers that includes a print data input responsive to a first halftone processor employing a first halftone technique, wherein the first halftoning technique is at least comparable to a target halftoning technique used by the target halftone printing press, altering logic for altering at least a plurality of areas distributed within at least some of the dots with substantially the same color alteration, and a processed print data output.

In a further general aspect, the invention features a proof generation apparatus for proof printers that includes means for receiving print data to be printed on a target halftone printing press to which a first halftoning technique has been applied, wherein the first halftoning technique produces a plurality of dots and is at least comparable to a target halftoning technique used by the target halftone printing press, means for altering at least a plurality of areas distributed within at least some of the dots with substantially the same color alteration, and means for providing the data to a proofing printer different from the target halftone printing press.

In a further general aspect, the invention features a proof generation method for proof printers that includes receiving halftoned print data to be printed on a target halftone printing press to which a first halftoning technique has been applied, wherein the first halftoning technique is at least comparable to a target halftoning technique used by the target halftone printing press, accessing color recipes that specify color values for the target halftone printing press in terms of color values for a proofing printer in response to the halftoned print data, producing proof print data based on the color values accessed in the step of accessing, and providing the proof printing data to the proofing printer different from the target halftone printing press.

In preferred embodiments, the step of producing proof printing data can employ a stochastic halftoning method. The stochastic halftoning method can employ stochastic thresholding arrays. The step of retrieving can retrieve the same recipe for differently sized halftone dot data values in the halftoned data. The step of retrieving can include receiving different values for both primaries and overprints.

In another general aspect, the invention features proofing apparatus that includes color recipe storage for storing color recipes that specify color values for the target halftone printing press in terms of color values for a proofing printer in response to halftoned print data to be printed on a target halftone printing press to which a first halftoning technique has been applied, wherein the first halftoning technique is at least comparable to a target halftoning technique used by the target halftone printing press, logic for producing proof printing data responsive to the color recipe storage, and a proofing print engine different from the target halftone printing press and responsive to the logic for producing proof printing data.

In preferred embodiments, the logic for producing proof printing data can employ a stochastic halftoning method. The stochastic halftoning method can employ stochastic thresholding arrays. The storage can store the same recipe for differently sized halftone dot data values in the halftoned data. The step of storing can store different values for both primaries and overprints.

In a further general aspect, the invention features proofing apparatus that includes means for receiving halftoned print data to be printed on a target halftone printing press to which a first halftoning technique has been applied, wherein the first halftoning technique is at least comparable to a target halftoning technique used by the target halftone printing press, means for accessing color recipes that specify color values for the target halftone printing press in terms of color values for a proofing printer in response to the halftoned print data, means for producing proof print data based on the color values accessed in the step of accessing, and means for providing the proof printing data to the proofing printer different from the target halftone printing press.

In another general aspect, the invention features an inkjet printing apparatus that includes a body defining a chamber, a plunger sized to move within the chamber, an actuator operatively connected to the plunger, an outlet defined in the chamber and operatively connected to an inkjet printing nozzle, a plurality of inlets defined in the chamber and each being operatively connected to one of a plurality of ink supply reservoirs, and a linear controller having a control input provided to the linear actuator.

In preferred embodiments, the actuator can be a stepper motor, with the linear controller being operative to supply a signal that includes a number of step pulses to windings of the stepper motor. A gasket can be proximate the head of the piston. A mixer can be operative to mix contents of the mixing chamber. The printer can include a plurality of chambers each responsive to a plurality of ink supply reservoirs. The printer can include a mixing chamber for each of the following colors: cyan, magenta, yellow, and black. The printer further can include a mixing chamber for at least one further color. The printer can include a dilution fluid chamber that has an output orifice, with the mixing chamber also being operatively connected to the dilution fluid chamber. The linear controller can be responsive to an ink recipe database.

In a further general aspect, the invention features an inkjet printing method that includes storing a plurality of inks, receiving an ink recipe defining at least one recipe color based on a plurality of inks, providing a succession of commands to a linear actuator, the commands corresponding to ink recipe amounts for the plurality of inks, moving the recipe amounts of the stored inks into a chamber by the linear actuator, and depositing the resulting recipe color using an inkjet printing method.

In preferred embodiments, the inks can be actively mixed in the chamber. The steps of receiving, storing, providing, drawing, and depositing can operate on each of the following colors: cyan, magenta, yellow, and black. The steps of receiving, storing, providing, drawing, and depositing can also operate on a dilution fluid.

In another general aspect, the invention features an inkjet printing apparatus that includes means for storing a plurality of inks, linear actuation means for moving the inks stored in the means for storing into a mixing chamber, means for providing a succession of commands to the linear actuator, the commands corresponding to ink recipe amounts for the plurality of inks stored in the means for storing, and means responsive to the mixing chamber for depositing the resulting recipe color using an inkjet printing method.

In a further general aspect, the invention features a method of printing an inkjet proof of a document to be printed with a half-tone reference printer that uses one of three or more different inks with each of a number of different plates produced by a setter based an effective horizontal image cell pitch and an effective vertical image cell pitch. The method includes receiving print data that describes half-tone dots having a predetermined perimeter using image cells at substantially the same horizontal image cell pitch and substantially the same vertical image cell pitch that is used by the setter to create the plates for the reference printer for the four or more colors, receiving predetermined amounts of a plurality of inks from a plurality of ink reservoirs to define a first mixed ink-jet ink of a predetermined color, receiving predetermined amounts of a plurality of inks from a plurality of ink reservoirs to define a second mixed ink-jet ink of a predetermined color, receiving predetermined amounts of a plurality of inks from a plurality of ink reservoirs to define a third mixed ink-jet ink of a predetermined color, receiving a proofing sheet including a first rectangular deposited ink drop printable face having a periphery defined by an ordered series of first, second, third, and fourth edges of the proofing sheet, and including a second rectangular face opposite the first face and also having a periphery being defined by the first, second, third, and fourth edges of the imposition proofing print sheet, with at least the first face having properties resulting from a deposited ink drop print-enhancing treatment, and generating a halftone proof by depositing the first, second, and third mixed inks on at least the first face of the proofing sheet at substantially the same horizontal cell pitch as the effective horizontal cell pitch of the data received in the step of receiving and at substantially the same vertical cell pitch as the effective vertical cell pitch of the data received in the step of receiving.

In preferred embodiments, the steps of mixing can be specified to match inks to be used on a reference printer. The method can further include the step of receiving predetermined amounts of a plurality of inks from a plurality of ink reservoirs to define a fourth mixed inkjet ink of a predetermined color, with the step of generating generating a halftone proof by further depositing the fourth mixed ink. The first, second, and third inks can be cyan, magenta, and yellow inks, respectively.

In another general aspect, the invention features an inkjet proofer for printing an inkjet proof of a document to be printed with a half-tone reference printer that uses one of four or more different inks with each of a number of different plates produced by a setter based an effective horizontal image cell pitch and an effective vertical image cell pitch. The proofer includes a first reservoir for a first ink of a predetermined color, a second reservoir for a second ink of a predetermined color, a third reservoir for a third ink of a predetermined color, a mixing chamber responsive to the first, second, and third reservoirs, and logic for generating a halftone proof by depositing the first, second, third, and fourth mixed inks on at least the first face of a proofing sheet at substantially the same horizontal cell pitch as the effective horizontal cell pitch of the data for the reference printer and at substantially the same vertical cell pitch as the effective vertical cell pitch of the data for the reference printer.

In preferred embodiments, the first, second, and third colors are: cyan, magenta, and yellow. The proofer can include a dilution fluid chamber having an output orifice, with the mixing chamber also being responsive to the dilution fluid chamber.

In a further general aspect, the invention features an inkjet proofer for printing an inkjet proof of a document to be printed with a half-tone reference printer that uses one of four or more different inks with each of a number of different plates produced by a setter based an effective horizontal image cell pitch and an effective vertical image cell pitch. The proofer includes means for receiving print data that describes half-tone dots having a predetermined perimeter using image cells at substantially the same horizontal image cell pitch and substantially the same vertical image cell pitch that is used by the setter to create the plates for the reference printer for the four or more colors, means for receiving predetermined amounts of a plurality of inks from a plurality of ink reservoirs to define a first mixed ink-jet ink of a predetermined color, means for receiving predetermined amounts of a plurality of inks from a plurality of ink reservoirs to define a second mixed ink-jet ink of a predetermined color, means for receiving predetermined amounts of a plurality of inks from a plurality of ink reservoirs to define a third mixed ink-jet ink of a predetermined color, means for receiving a proofing sheet including a first rectangular deposited ink drop printable face having a periphery defined by an ordered series of first, second, third, and fourth edges of the proofing sheet, and including a second rectangular face opposite the first face and also having a periphery being defined by the first, second, third, and fourth edges of the imposition proofing print sheet, with at least the first face having properties resulting from a deposited ink drop print-enhancing treatment, and means for generating a halftone proof by depositing the first, second, and third mixed inks on at least the first face of the proofing sheet at substantially the same horizontal cell pitch as the effective horizontal cell pitch of the data received by the means for receiving and at substantially the same vertical cell pitch as the effective vertical cell pitch of the data received in the step of receiving.

Systems and methods according to the invention can permit substantially better simulation by a proofer of the output of a target press. By superimposing two halftoning techniques together or by mixing inks, such systems and methods can yield a proof that represents the halftone pattern as well as the color of the press, and this proof should allow Moiré patterns to be predicted more accurately. Predicting Moiré patterns can allow a user to correct them before undertaking the potentially expensive and time consuming task of running the print job on the press.

Systems and methods according to the invention can provide these advantages with minimal impact on the printed halftone dots. By spreading dots around and using a printer that exhibits some overlap, the visual impact of the second halftoning technique can be minimized. As a result, the proof can also more closely predict press output when inspected under magnification. And by providing for recipe lookup based on combined screened bitmap data, proofs can be obtained in a highly efficient manner.

DESCRIPTION OF AN ILLUSTRATIVE EMBODIMENT

As discussed above, one aspect of the invention provides for creating half-tone ink-jet proofs on print-enhanced sheets based on an effective image cell pitch of at least about 2400 image cells per inch that substantially matches a cell pitch used to create press plates. To achieve this end, print process variables can be adjusted for an ink-jet proofing printer based on received color matching information. These adjustments can define sub-area printing values that allow at least some dots to be printed with areas of different inks. Or they can define preprint ink mixing ratios that allow at least some image cells to be printed with ink mixtures. The former approach will be described first.

Figure 1:
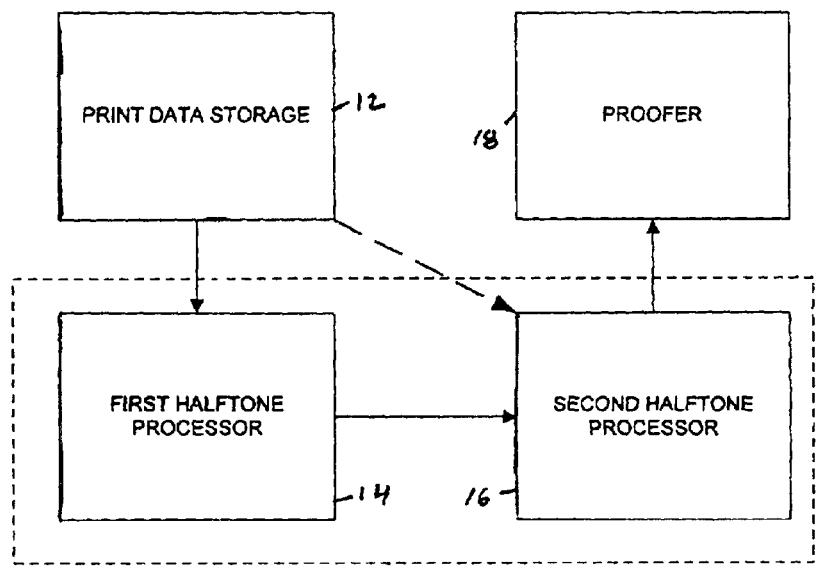
FIG. 1 is a block diagram illustrating an embodiment of a system according to the invention.

Referring to FIGS. 1 and 2, an embodiment of a first type of system 10 according to the invention uses two halftoning techniques together, one to match the halftone pattern of the press and the other to match the color of the press. Such a system can include a first half-tone processor 14 having an input responsive to a source of print data, such as the output of a print data storage device 12. The system can also include a second halftone processor 16 responsive to the first halftone processor and having an output provided to a proofing printer 18. The second halftone processor may also be responsive to the print data. The proofing printer can be a high-resolution ink-jet printer.

Figure 2A:
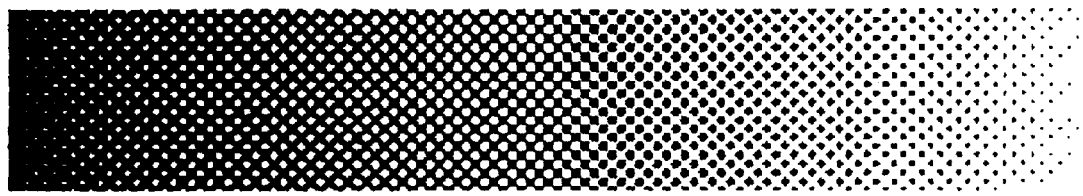
FIG. 2A is a halftoned vignette using conventional amplitude modulation of the dots.
Figure 2B:
FIG. 2B is a halftoned vignette using stochastic frequency modulation of the dots.

The first halftone processor 14 generally performs a conventional halftone operation, which achieves shading by varying the size of constantly spaced dots, as shown in FIG. 2A. The second halftone processor 16 typically performs a different type of halftone processing, such as a stochastic halftoning. As shown in FIG. 2B, stochastic halftoning is a frequency modulated process in which the size of the dots remains constant and their position is varied, forming a randomly placed pattern. Other types of processes, such as a Bayer process, may also be implemented by the second halftone processor.

Since the dot clusters printed by the press are typically much larger and at a lower resolution than the proofing device is capable of printing, the second halftoning process can be used to tint them. The higher the resolution of the proofing device and the smaller the spot size it can produce, the less visible the second halftoning pattern and the more continuous it appears. As discussed below, it can also beneficial to use an overlapping print pattern to further reduce visibility of the halftoning pattern.

The first and second halftone processors can be integrated within the proofer or located remotely in other pre-press hardware. They can be implemented using dedicated electronic circuitry, using a specially programmed processor, or both. In one embodiment, the halftone processors are each implemented using a software module on a workstation-class computer connected to the proofer. Note that in at least some instances it may be desirable to combine the operations of the two processors such that they operate on the print data substantially simultaneously by mathematically combining the operations performed by each of them. The order of application of the processes may also be reversed. The halftoning techniques themselves are well known in the art and therefore will not be discussed further here.

Figure 3:
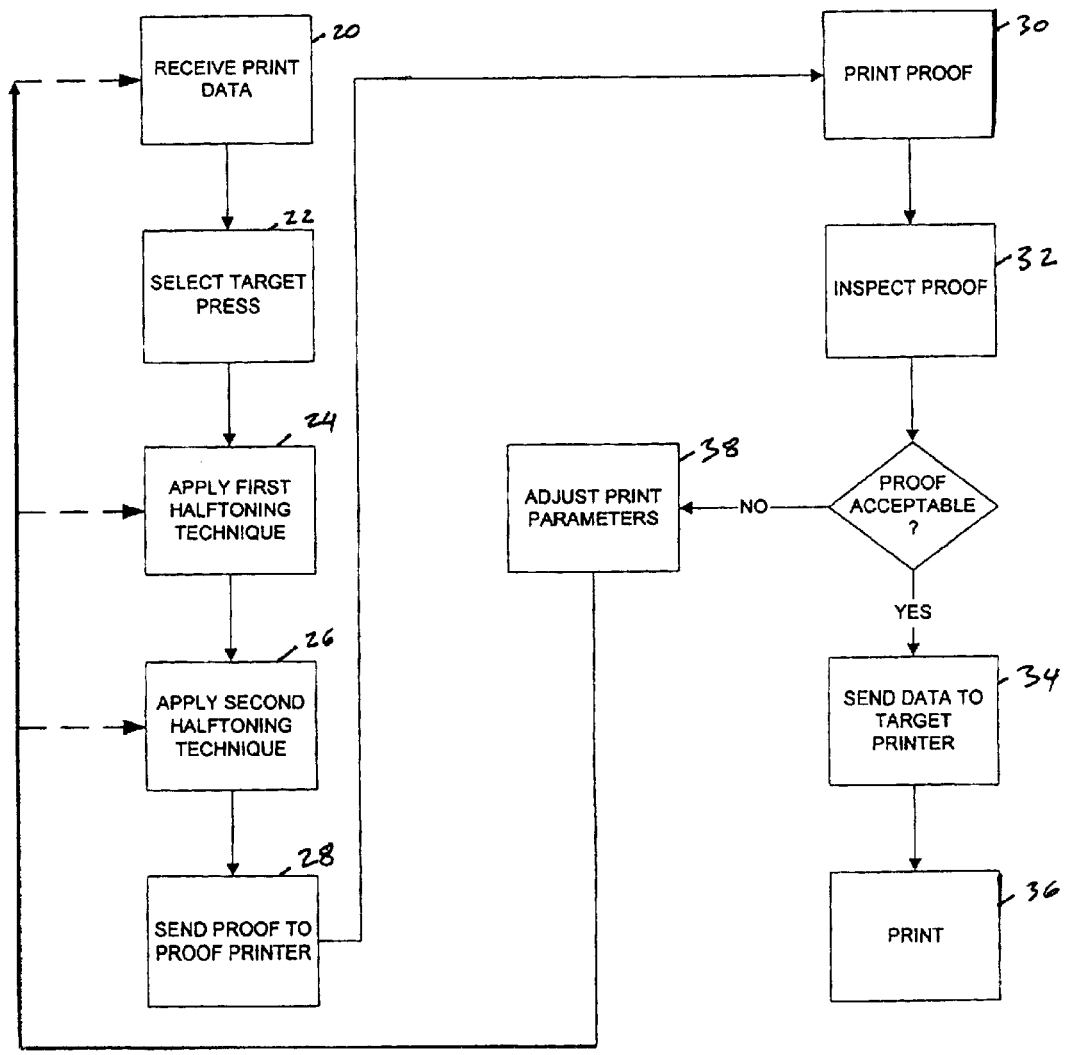
FIG. 3 is a flowchart illustrating the operation of the system of FIG. 1.

Referring to FIG. 3, overall operation of the system 10 begins with the receipt of digital print data (step 20), such as from storage, and the selection of a target press (step 22). Selection of the target printer by the user effectively selects one of a series of CMYK value sets for the selected target press. Note that while in this embodiment the press operates by pressing plates on a printing medium, the term is intended to cover any type of target printing device that a proofer can be used to simulate.

The first halftoning processor 14 then applies the first halftoning technique to the data (step 24), and the second halftoning processor 16 applies the second halftoning technique to the resulting data (step 26). These data are then sent to the proofer 18 and printed (steps 28, 30). The resulting proof can then be inspected by an operator to determine whether the output is acceptable (step 32). If the proof is acceptable, the data as processed by the first halftoning processor can be sent to the target printer and printed (steps 34, 36). If the proof is not acceptable, the operator can adjust one or more print parameters (step 38) before generating another proof. These adjustments may include changes to the print data or to parameters of the first halftoning operation. They may also include changes to parameters of the second halftoning operation, such as in the case of a color calibration or correction. Any of these changes may be performed manually, or it may be automated (e.g., using a spectrophotometer) to achieve feedback control of the relevant parameters.

Figure 4:
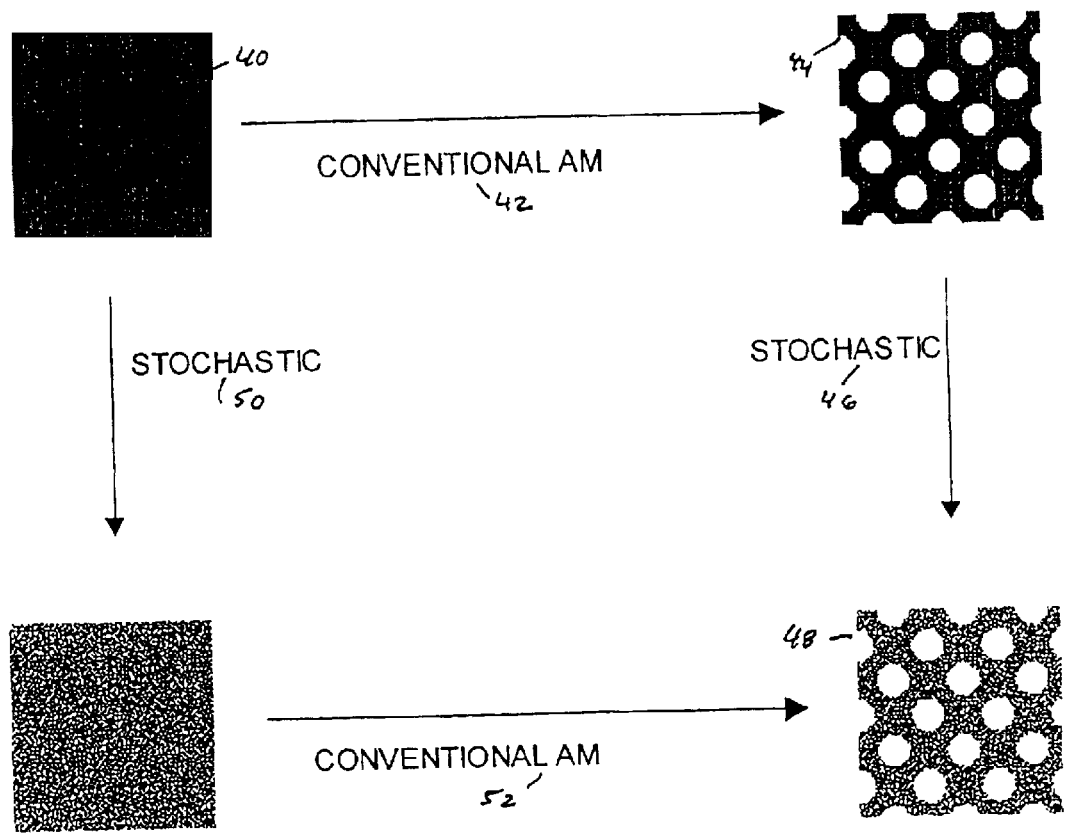
FIG. 4 is a flowchart illustrating the second set of halftoning operations performed during the operation of the system of FIG. 1.

Referring to FIG. 4, data representing a square 40 to be printed with a target primary or spot color can be converted to a conventional halftone representation 44 by applying a conventional halftoning technique 42. This representation can then be printed on the printing press or on the proofer, but unless the CMYK values for the colorants used by the two devices are the same the color of the box in their output will differ. By applying the stochastic halftoning operation 46 to the conventional halftone representation, however, the one or more colors represented by the conventional halftone representation can be tinted to result in a twice-halftoned representation 48 that more closely matches the color of printing the conventional halftone representation on the target press. The Moiré pattern of this representation should also match that of the target press. Note that the order of the halftoning operations can be reversed by applying a stochastic halftoning operation 50 followed by a conventional halftoning operation 52, which can be applied in the form of a mask.

Figure 5:
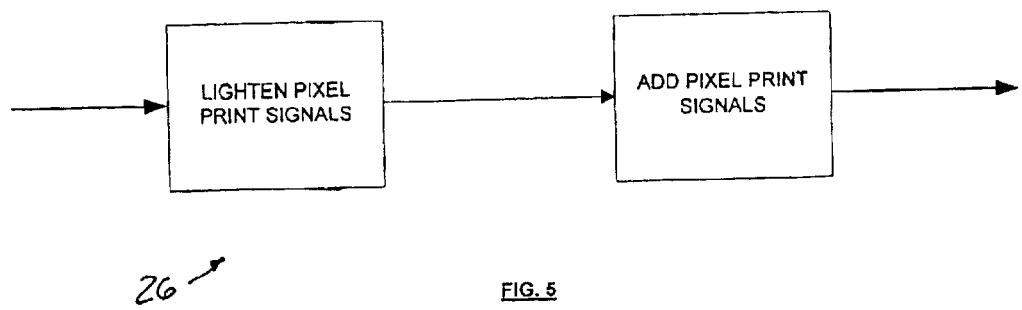
FIG. 5 is a schematic state diagram for the system of FIG. 1.
Figure 6:
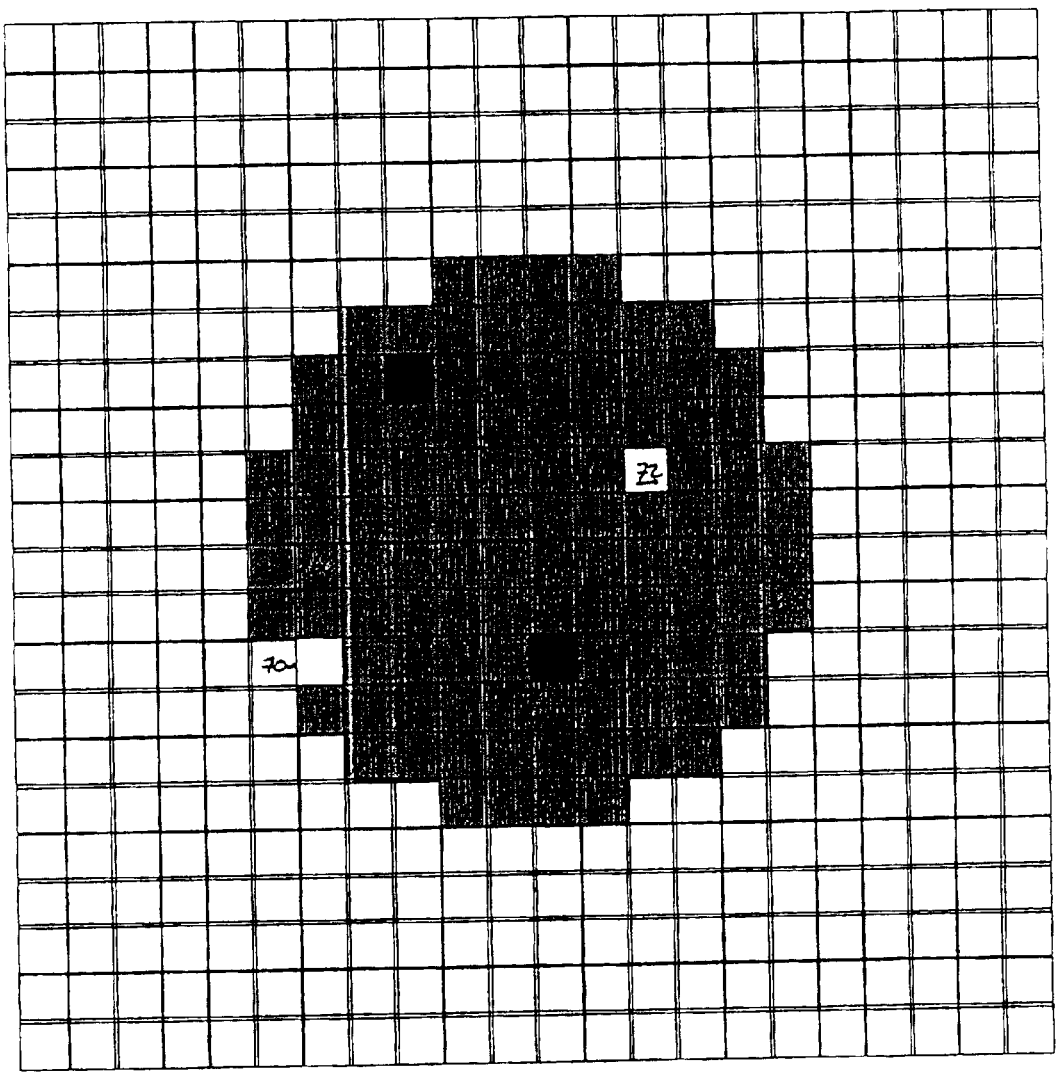
FIG. 6 is a schematic diagram showing an enlarged halftone dot as printed by the system of FIG. 1.

Referring to FIGS. 5 and 6, the tinting can be carried out by adding areas of colorant, lightening areas of colorant, or both. Adding colorant areas results in one or more smaller areas of different primary or spot colors being defined on a primary color dot. For example, a plurality of pixel-sized areas (or cells) of a first color 62, 64 (e.g., magenta) and a plurality of pixel-sized areas of a second color 66, 68 (e.g., yellow) can be added to a dot of a third color (e.g., cyan). Addition of colorant to a dot can take place by actually printing one ink on top of the other (overlaying) or by printing the added colorant at a particular position and refraining from printing the underlying dot color at that position (substituting). The use of high-chroma inks allows a variety of target colors to be reproduced.

Lightening areas of colorant generally involves refraining from printing one or more pixels within a dot (see e.g., pixels 70, 72), thereby reducing the apparent saturation of the dot. Where a proofer can print pixels with different densities, partial lightening may be performed by reducing print density of a pixel instead of refraining from printing it. In one embodiment, ink is selected such that default dots are printed with some blank pixels, allowing the user to increase or decrease their saturation.

The lightening and addition processes are particularly well suited to use with proofers that employ pixels exhibiting at least some overlap. This can make added or lightened pixels less apparent. High-resolution ink-jet printers are particularly well suited to such a task, as they can be made to exhibit some degree of overlap between adjacent deposited drops. In one embodiment, promising results were obtained from an ink-jet printer exhibiting an overlap sufficient to cause surrounding pixels to completely cover the lightened pixels. Ink-jet printers also have the advantage of producing relatively transparent marks on the page, resulting in reduced visibility of added drops.

It is also preferable to use more, smaller areas, such as individual pixels, for both lightening and addition, and to distribute them over the surface of the dots. This makes the effects of the double-halftoning less conspicuous, particularly where dots overlap. As resolution of the proofer is increased, tinting pixels can be distributed more evenly, making them less noticeable. The required resolution will depend on a number of factors, including the target press's resolution and the quality of the print jobs to be proofed.

Note that in the present embodiment lightened pixels can fall on or near the edge of a halftone dot, and this can lead to a slight perceived irregularity in the shape of the dot under magnification. It has also been observed, however, that at least in some instances dots exhibiting this type of irregularity tend to actually resemble dots produced by the target press more than the more perfect-looking dots that would otherwise be produced.

Figure 7:
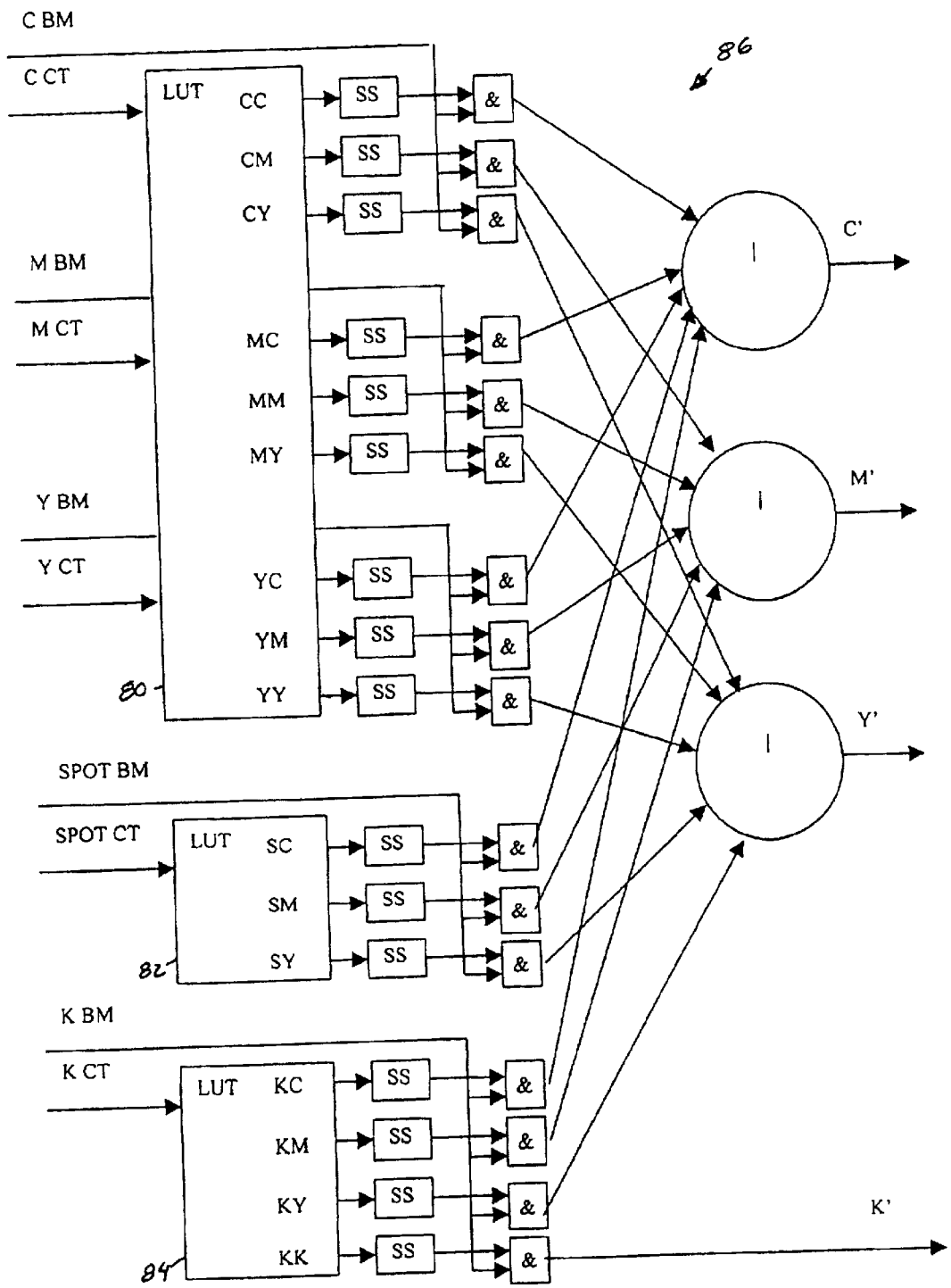
FIG. 7 is a block diagram of an implementation of portions of the system of FIG. 1.

Referring to FIG. 7, the tinting process for CMYK and a spot color can be implemented using three look-up tables 80, 82, 84 and a multi-stage combinatorial logic circuit 86. The first look-up table 80 receives three primary color continuous tone separations C CT, M CT, and Y CT at its address inputs. The look-up tables determine an amount of contamination for each screen dot and, for the case of CM and Y, ensure that the overprints are color correct as well.

The outputs of the look-up tables are each provided to the input of a high frequency stochastic screening module SS. The resulting outputs are then masked with the screened separations C BM, M BM, and Y BM in a logical AND operation &. This ensures that the color contamination will appear only in the actual screen dot. The screened bitmap separations BM are prescreened at the native machine resolution.

The output data (C'M'Y'K') data to the actual ink channels are the summation or logical OR of the different components from the different separations. This allows the image to be printed on a single pass.

There appear to be a few limitations using the above-described method. First, the color gamut of the inks needs to exceed that of the process colors. If it does not, contamination may not be possible, since the ink may have already been used by the primary color. In addition, yellow screen dots may not contaminate very well. A small drop of cyan, for instance will be quite noticeable. It is therefore preferable to start with a yellow ink that has a hue which is very close to that used by the target press.

A few simplifications may allow for a reduction in the computational power required. First, if the hue of the cyan and magenta is chosen such that it will always require yellow contamination, then some of the calculations will not have to be done, because there is no magenta in the cyan and vice versa. This may also have the benefit of less noticeable contamination. In addition, black can be assumed orthogonal since CMY are not considered when it is printed. If the overprint of CM and Y is close in color, the CMY LUT can be split into separate C, M, and Y LUTs, and this can greatly simplify calibration. Note that although it is not shown in FIG. 7, it also possible to extend the concept such as to use additional primary colors and spot colors, and/or to add tint colors to black.

In many situations, the original continuous tone image data for the proof is unavailable. The underlying colors that a half-tone image data set represent are therefore may not be readily available. And because such representations tend to be voluminous, the application of this technique may be impractical in some situations.

Fortunately, our investigations of ink blending formulations based upon theoretical color science indicate that halftone image structure tends to produce very linear hue vectors for the primary colors. Varying the fill percentage in halftone dot can make some adjustment in hue of the printed color as well. This observation supports a technique that may be applied to the screened image data to produce a final halftone proof of the correct colors.

If the hue of the colorants is presumed constant as dot size increases (i.e., chroma increases), we can establish a 'recipe' for each of the primary colors in the screened data. The recipes define the amount of ink that is required to produce a color match with the press at the 100 percent dot. Assuming that the hue is constant as the halftone cell fills, the original color of the press sheet can be recreated by contaminating the screened data with the recipe color formula. This approach will be referred to as the 'first order approximation'.

The first order approximation does not take into account the trapping behavior on press when one color is printed on top of another color. But the behavior of the overprints can be modeled by developing recipe formulas for each overprint. In a halftone image, pixels are either on or off, so the image color at each pixel location can only attain a limited number of colors (primaries and overprints). Armed with the recipes for the overprints, cells in the original screen data (the source bitmaps) can be converted into output cell data for the primaries and overprints. In practice, this would lead to eight colors (CMYKRGB,3C) each of which is described with a recipe. This approach will be referred to as the 'second order approximation'.

The first order approximation can be implemented in a very straightforward approach. The first step is to distill the recipe formulas into sets of stochastic screening tiles. The tiles are created through the use of stochastic threshold arrays (the tile definitions) and the fill percentage for the contributing colorants. The tiles can be created on the fly, or they can be stored for different percentage levels.

For example, presume a recipe for the output cyan (the color that would appear on press) of 70% cyan, 4% magenta, 7% yellow, and 0% black. This recipe creates a set of three stochastic tiles for the cyan plate. Each tile is created by finding the field value that produces a bitmap tile with the proper number of pixels set to match the ink percentage in the recipe. For the cyan tile, this would set 70% of the pixels in the bitmap. The positions of the pixels are determined by the threshold array. The pixels are set when the field value is greater then the value at the pixel location in the threshold array. There is no black tile in this example because there is no contamination contribution to the output cyan plate from black ink.

This procedure can be repeated for the other plate colors, (MYK for a four color process) to arrive at a set of contamination tiles for each output plate. The source bitmap for each plate is processed into a set of output bitmaps by performing a logical AND between the source data and the tile data. The resulting bitmap set contain the pixels that are to be printed on the proofer for each of the ink channels (CYM and K). This would render the single channel, in this case cyan, on the proofer that would match both the dot structure and the image structure on the target printer. The final set of image bitmaps sent to the proofer is the logical OR of each set of bitmaps created for each source plate in the input stream.

The process of color matching the press sheet can be summarized below. Letting Cp be the color of the press sheet the recipe color should match then $$Cp=Cc+Mc+Yc+Kc;$$

Where Cc is the cyan contribution for the cyan plate on the press, Mc is the Magenta contribution for the cyan plate on the press, etc . . . .

Similarly, $$Mp = Cm + Mm + Ym + Km;$$

$$Yp = Cy + My + Yy + Ky;$$

$$Kp = Ck + Mk + Yk + Kk;$$

The bitmap data sent to the proofer is the logical sum of each of the plate color contributions, so if Ci represents the bitmap data sent to the proofer then;

$$Ci = Cc + Cm + Cy + Ck;$$

Similarly, $$Mi = Mc + Mm + My + Mk;$$

$$Yi = Yc + Ym + Yy + Yk;$$

$$Ki = Kc + Km + Ky + Kk;$$

The creation of the contamination tiles is only a modest computation, as the application of the tiles to produce the cross contamination is very simple, just a series of logical AND and OR operations. This is important because a 4-up image at 2400 dpi is composed of 4.3 billion pixels per plate, assuming no bleed, captions or gutters, and even simple operations therefore need to be accomplished quickly.

Referring to FIG. 7, the first order approximation can also be implemented using look-up tables 80, 82, 84 and a multi-stage combinatorial logic circuit 86, as presented above. In this case, however, the look-up table 80 stores recipe values and receives halftone data at its address inputs. The outputs of the look-up tables are each provided to the input of stochastic screening modules SS that provide the stochastic screening tiles, and the resulting outputs are masked with the screened separations C BM, M BM, and Y BM in a logical AND operation &. The output data (C'M'Y'K') data to the actual ink channels are the summation or logical OR of the different components from the different separations.

The implementation strategy for the second order approximation is similar to the implementation proposed for the first order approximation. Additional recipes are created for the overprints and the source bitmaps are dissected into a set of primary and overprint bitmaps.

The source bitmap data is culled into a set of bitmaps for each of the recipe colors (for example CMYKRGB,3C). This process involves overlaying the plates with logical 'AND' and 'NOT OR' operations to separate the areas in the source bitmaps that would produce overlapped colors. Once the plate bitmaps have been culled into the primary and overprint plates, recipes can be applied to create the contamination bitmaps. In this approximation there are now recipes for both the primaries and the overprints. The workflow is similar to the first order approximation; although the number of bitmaps involved may have doubled, processing involves only logical operations. The subject matter of this application is related to the information included in U.S. application Ser. No. 09/385,335 as published in PCT application WO 01/17231, which is herein incorporated by reference.

Figure 8:
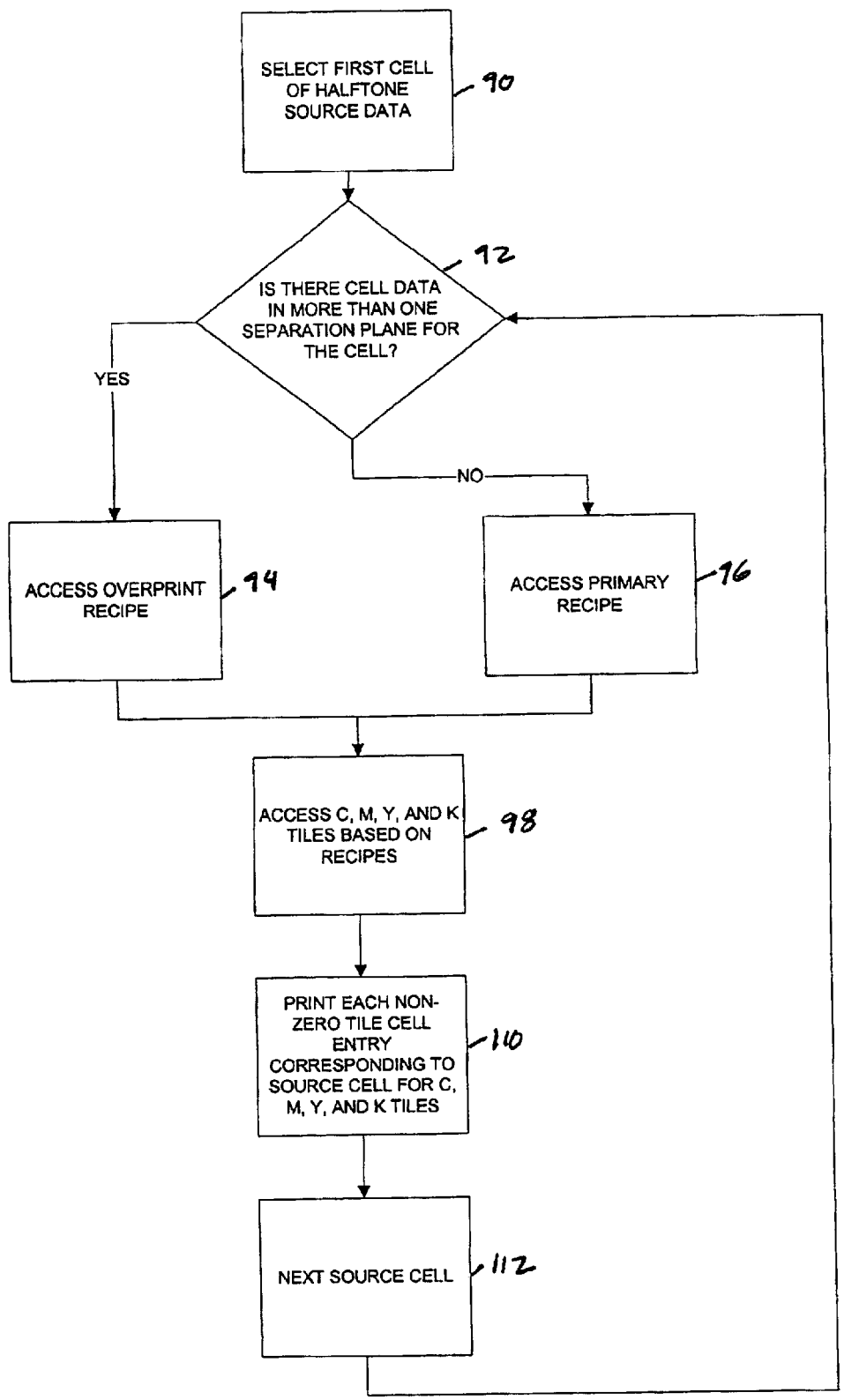
FIG. 8 is a flowchart illustrating the operation of an alternative implementation of the portions of the system of FIG. 7.

Referring to FIG. 8, operation of a system that employs the second order approximation can begin with the selection of halftone source data for a first cell (step 90). The system then determines whether there is cell data in more than one separation plane for the cell (step 92). If there is cell data in more than one separation plane for the cell, the system accesses an overprint recipe (step 94). If there is not cell data in more than one separation plane for the cell, the system accesses a primary recipe (step 96).

The system uses the selected recipe to access C, M, Y, and K stochastic screening tiles (step 98). If there are non-zero entries in these tiles that correspond to the source cell, these entries are printed, preferably as the print head advances in a cell-by-cell progression (step 100). The process is then repeated for the next cell (see step 102).

Figure 9:
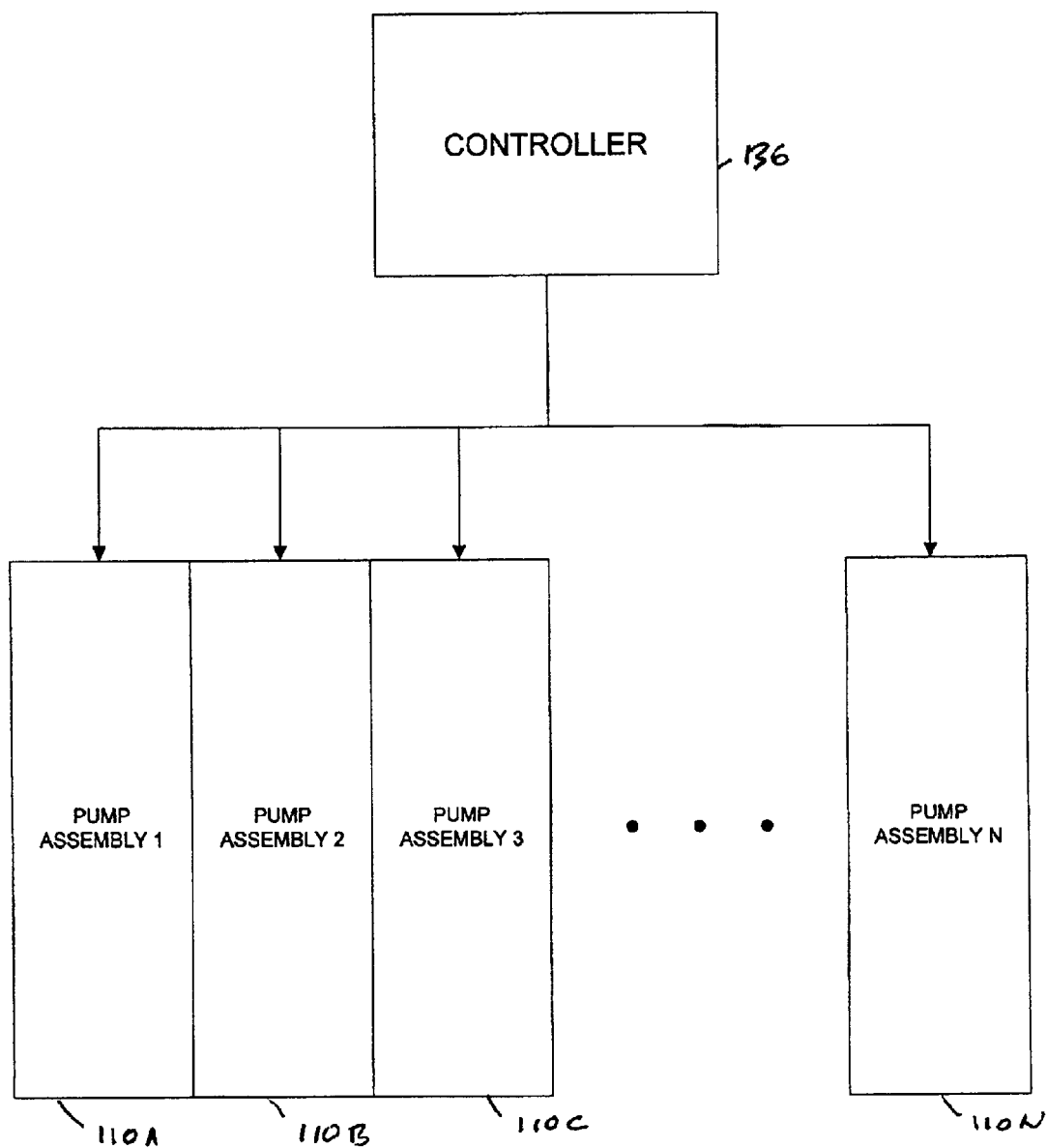
FIG. 9 is a block diagram of a mixing pump array for use in a system according to the invention.

Referring to FIG. 9, a system according to a second embodiment of the invention contemplates achieving color matching by mixing inks. Systems according to this embodiment can include a series of mixing pump assemblies 110A, 110B, 110C, . . . 110N that are all responsive to mixing control logic, such as can be provided for in a controller 136. Each of these mixing pump assemblies can mix inks to create an ink mixture of a desired color. These mixtures can then be used to closely match primary and spot colors to be used by a target printer.

Figure 10:
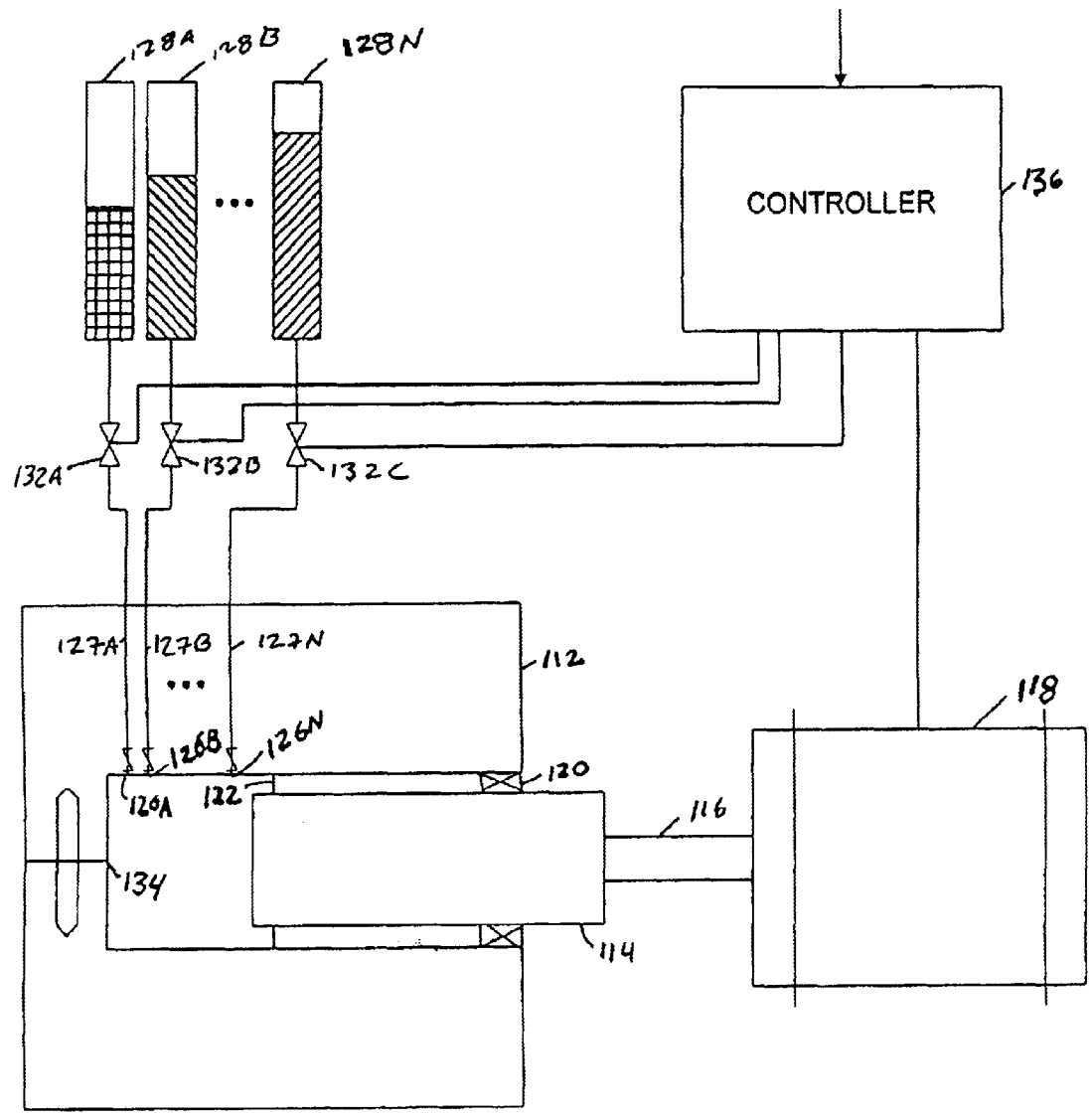
FIG. 10 is a diagrammatic illustration of an inkjet mixing system according to a alternative embodiment of a system according to the invention.

Referring to FIG. 10, each mixing pump (e.g., 110A) includes a body 112 that defines a mixing chamber. A plunger 114 rides in and out of the chamber on a lead screw 116 that is coupled to an output shaft of a motor 118, such as a stepper motor. A seal placed at the entrance to the chamber (120) or at the end of the plunger opposite the motor (122) seals a variably sized mixing cavity within the chamber.

The body 112 also defines a series of inlets 126A, 126B, . . . 126N that each hydraulically connect the interior of the chamber to one of a series of vessels 128A, 128B, . . . 128N via a series of feed lines 127A, 127B, . . . 127N. The vessels each contain one of a set of different inks, or a dilution fluid. Each of the feed lines is equipped with an electrically actuated feed valve 132A, 132B, . . . 132N to select an ink to be dispensed, and each of the inlets can also be equipped with a check valve 132A, 132B, . . . 132N to prevent fluid from the mixing chamber from flowing back into the vessels. Where the inlets are located on the side of the chamber, it is preferable to locate the inlets at the end of the throw of the plunger to prevent or reduce obstruction by the plunger. At the end of the chamber there is an outlet 134 that hydraulically connects the chamber to a conventional ink-jet nozzle. In this embodiment, the chambers have a nominal volume of 10 cubic centimeters.

A controller 136 has a series of valve control outputs operatively connected to control terminals of the feed valves 132A, 132B, . . . 132N. It also has a motor control terminal operatively connected to one or more terminals of the motor 108, such as the step windings of a stepper motor. The controller can control coils 124 that perform mixing of the inks in the chamber as well. The controller can be a stand-alone mixing controller or it can be part of a larger printer controller that controls other aspects of the printer, such as calibration, cleaning, and sheet loading. The controller can be implemented with hardwired circuitry, special-purpose software running on a general-purpose processor, or a combination of both.

The controller has a recipe input that is responsive to a signal defined by user commands that specify ink mixture recipes. The user can enter his or her recipe commands in a number of ways. For example, they can be entered at dedicated controls provided on the machine, they can be sent as control signals from a computer, or they can be embedded in the print data to be printed. The recipe commands can directly specify mixed amounts of ink, or they can select one of a series of predefined mixture sets.

Note that while the present embodiment contemplates a series of separate mixing pumps, it will be apparent that other types of hydraulic arrangements can achieve ink mixing according to the invention. For example, it may be beneficial to use common supply vessels to supply the different pumps, with check valves to prevent backflow between pumps. Or it may be beneficial to mix ink in one or more intermediate mixing chambers, before introducing the mixed inks into the inkjet pumps.

And while plunger-based pumps are used in the present embodiment, other types of pumps could also be used to perform the mixing of inks. Note however that using a plunger-based pump allows a single actuator to both measure and deposit ink. The pumps can also employ other types of mixing, such as ultrasonic mixing or mechanical mixing.

Figure 11:
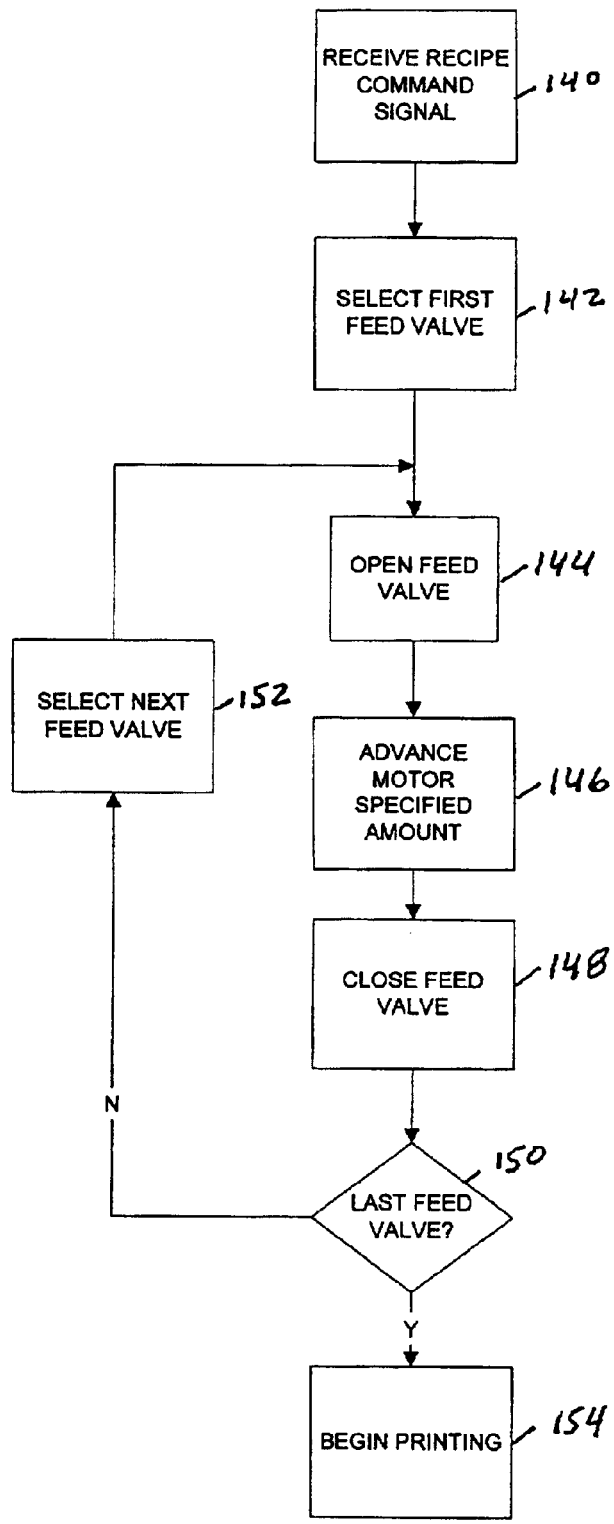
FIG. 11 is a flowchart illustrating the operation of the system of FIG. 9.

In operation, referring to FIGS. 9–11, when the user begins a proofing job in which new inks are needed, he or she provides a recipe for a set of ink mixtures to the controller (step 140). The controller then issues an open control signal to the first feed valve called for in the recipe (e.g., 132A—step 144), followed by a first motor advance signal to the motor 118 (step 146). The motor advance signal specifies a distance to advance the motor, and thereby determines an amount of the first ink to be drawn into the chamber. In the case of a stepper motor, for example, the controller can specify the distance in terms of steps. Once the motor has moved the plunger through the requisite distance, the controller issues a close control to the first feed valve 132A (step 148).

The controller then successively issues a similar set of control signals for each of the rest of the feed valves specified in the recipe, each time causing the plunger to draw more of a different ink or dilution fluid into the chamber (see steps 150, 152). Once the plunger has reached the end of its throw, which may be defined by the recipe, the chamber will contain ink of the required color. This ink can then be mixed using the mixer, although mixing can also take place during or between filling steps.

Once the last chamber has been filled, the proofer 18 can begin to generate the proof (step 154). This step can employ the same data file that is to be used on the target (or reference) printer, because the inks on the two machines will be matched. The outputs of the two machines should therefore also be matched.

In the embodiment presented, an overall controller simultaneously controls all of the pump assemblies 110A, 110B, 110C . . . 110N to produce different mixtures of inks. In other embodiments, mixing may take place in a staggered fashion. It may also be possible to partially fill some or all of the pump assemblies for smaller runs and thereby avoid wasted ink, to fill the different pumps to different degrees in anticipation of particular printing requirements, or to top off partially full pumps during idle periods using fractional recipes. In some instances, it may even be possible to fill some chambers while others are occupied with printing operations, such as to preload spot colors for a next run. Printing preferably takes place on a cell-by-cell basis, rather than on a dot-by-dot basis, with halftone dots being progressively assembled in a number of passes.

The ink colors are preferably chosen specifically for mixing. They should be compatible with each other, with dye-based inks being preferable in this regard. The inks can also be high-chroma inks, to allow for a wider gamut. Note that the chambers may be cleaned out between printing operations that employ different sets of colors to avoid contamination. To this end, the chambers can be repeatedly filled with cleaning fluid and then purged (e.g., three times).

Ink mixing recipes can be stored in a database available to the operator of the machine. The operator can then specify desired target color values for the inks to be mixed, and the system can retrieve a corresponding ink recipe from the database. The database can be populated empirically, with some degree of interpolation. It may also be possible to derive recipes using predictions from Beer's law with Sanderson's correction formula. These derivations may be performed in real time to provide values for specific print runs, or they can be used to populate the database.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A method of printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch, the method comprising:

receiving print data that describes half-tone dots having a predetermined perimeter using image cells at substantially the same horizontal image cell pitch and substantially the same vertical image cell pitch that is used by the setter to create the plates for the reference printer for the four or more colors, receiving a proofing sheet including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment, and making a half-tone proof for the four or more colors with an inkjet proofer on at least the first face of the proofing sheet at substantially the same horizontal cell pitch as the effective horizontal cell pitch of the data received in the step of receiving and at substantially the same vertical cell pitch as the effective vertical cell pitch of the data received in the step of receiving.

2. The method of claim 1 further including the step of receiving color matching information for the ink set to be used by the reference printer to print the document, further including the step of adjusting print process variables for the inkjet proofing printer based on the color matching information received in the step of receiving, and wherein a step of printing prints according to these process variables.

3. The method of claim 2 wherein the step of adjusting defines preprint ink mixing ratios, and wherein the step of printing prints at least some of the image cells with ink mixtures.

4. The method of claim 2 wherein the step of adjusting defines sub-area printing values, and wherein the step of printing prints at least some of the dots with a plurality of areas of different inks.

5. The method of claim 2 wherein the step of adjusting defines sub-area printing values, and wherein the step of printing prints at least some of the dots with at least one overlapping ink area.

6. The method of claim 2 wherein the step of adjusting defines sub-area printing values, and wherein the step of printing prints at least some inked dots with at least one blank area within their perimeters.

7. The method of claim 1 wherein a step of printing employs the same electronic print representation used by the setter.

8. The method of claim 7 wherein the setter is a direct-to-plate plate setter that produces the plates directly and wherein the electronic print representation is an electronic print representation readable by the plate setter.

9. The method of claim 7 wherein the setter is a reduced format film setter that produces scaled films at a scaled resolution that when enlarged to produce the plates produces plates that are based on the effective resolution, and wherein the electronic print representation is an electronic print representation readable by the film setter.

10. The method of claim 1 wherein a step of printing prints one image cell for each of substantially all of the image cells in the data received in the step of receiving on a print substrate for at least one of the plates.

11. The method of claim 1 wherein the second face has properties resulting from the deposited ink drop print-enhancing treatment.

12. The method of claim 1 wherein the step of proofing employs a proofing sheet that is a B-size or larger sheet.

13. The method of claim 1 wherein the step of proofing employs a proofing sheet that is a 4-up or larger sheet.

14. The method of claim 1 wherein the step of making a proof employs a continuous inkjet printing technique.

15. The method of claim 1 wherein the step of making a proof employs a drop-on-demand printing technique.

16. The method of claim 1 wherein the step of making a proof employs dye-based inks.

17. The method of claim 1 wherein the step of proofing employs software, ink, and media having tolerances that produce an effective color range of $4\Delta e$ in CIE color space.

18. The method of claim 1 wherein the step of receiving a proofing sheet receives a proofing sheet with the second face also having properties resulting from a deposited ink drop print-enhancing treatment, and wherein the step of making a half-tone proof further makes a half-tone proof on the second face of the proofing sheet at substantially the same horizontal cell pitch as the effective horizontal cell pitch of the data received in the step of receiving and at substantially the same vertical cell pitch as the effective vertical cell pitch of the data received in the step of receiving.

19. An inkjet proofer for printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch, the proofer comprising:

storage for print data that describes half-tone dots having a predetermined perimeter using image cells at substantially the same horizontal image cell pitch and substantially the same vertical image cell pitch that is used by the setter to create the plates for the reference printer for the four or more colors, a feed mechanism for receiving a proofing sheet including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment, and logic responsive to the storage for generating a half-tone proof for the four or more colors with an inkjet proofer on at least the first face of the proofing sheet received by the feed mechanism at substantially the same horizontal cell pitch as the effective horizontal cell pitch of the data received in the step of receiving and at substantially the same vertical cell pitch as the effective vertical cell pitch of the data received in the step of receiving.

20. An inkjet proofer for printing an inkjet proof of a document to be printed with a half-tone reference printer that uses one of four or more different inks with each of a number of different plates produced by a setter based an effective horizontal image cell pitch of at least about 2400 image cells per inch and an effective vertical image cell pitch of at least about 2400 image cells per inch, the proofer comprising:

means for storing print data that describes half-tone dots having a predetermined perimeter using image cells at substantially the same horizontal image cell pitch and substantially the same vertical image cell pitch that is used by the setter to create the plates for the reference printer for the four or more colors, means for receiving a proofing sheet including a first rectangular deposited ink drop printable face having a periphery defined by an ordered series of first, second, third, and fourth edges of the proofing sheet, and including a second face opposite the first face and also having a periphery being defined by the first, second, third, and fourth edges of the imposition proofing print sheet, with at least the first face having properties resulting from a deposited ink drop print-enhancing treatment, and means responsive to the means for storing for generating a half-tone proof for the four or more colors with an inkjet proofer on at least the first face of the proofing sheet received by the means for receiving at substantially the same horizontal cell pitch as the effective horizontal cell pitch of the data received in the step of receiving and at substantially the same vertical cell pitch as the effective vertical cell pitch of the data received in the step of receiving.

21. A proof generation method for proof printers, comprising the steps of:

receiving halftoned print data to be printed on a target halftone printing press to which a first halftoning technique has been applied, wherein the first halftoning technique is at least comparable to a target halftoning technique used by the target halftone printing press, accessing color recipes that specify color values for the target halftone printing press in terms of color values for a proofing printer in response to the halftoned print data, producing proof print data based on the color values accessed in the step of accessing, and providing the proof printing data to the proofing printer different from the target halftone printing press.

22. The method of claim 21 wherein the step of producing proof printing data employs a stochastic halftoning method.

23. The method of claim 22 wherein the stochastic halftoning method employs stochastic thresholding arrays.

24. The method of claim 21 wherein the step of accessing accesses the same recipe for differently sized halftone dot data values in the halftoned data.

25. The method of claim 21 wherein the step of accessing includes accessing different values for both primaries and overprints.

26. Proofing apparatus, comprising:

color recipe storage for storing color recipes that specify color values for the target halftone printing press in terms of color values for a proofing printer in response to halftoned print data to be printed on a target halftone printing press to which a first halftoning technique has been applied, wherein the first halftoning technique is at least comparable to a target halftoning technique used by the target halftone printing press, logic for producing proof printing data responsive to the color recipe storage, and a proofing print engine different from the target halftone printing press and responsive to the logic for producing proof printing data.

27. The apparatus of claim 26 wherein the logic for producing proof printing data employs a stochastic halftoning method.

28. The apparatus of claim 27 wherein the stochastic halftoning method employs stochastic thresholding arrays.

29. The apparatus of claim 26 wherein the storage stores the same recipe for differently sized halftone dot data values in the halftoned data.

30. The method of claim 26 wherein the step of storing stores different values for both primaries and overprints.

31. Proofing apparatus, comprising:

means for receiving halftoned print data to be printed on a target halftone printing press to which a first halftoning technique has been applied, wherein the first halftoning technique is at least comparable to a target halftoning technique used by the target halftone printing press, means for accessing color recipes that specify color values for the target halftone printing press in terms of color values for a proofing printer in response to the halftoned print data, means for producing proof print data based on the color values accessed in the step of accessing, and means for providing the proof printing data to the proofing printer different from the target halftone printing press.

32. An inkjet printing apparatus, comprising:

a body defining a chamber, a plunger sized to move within the chamber, an actuator operatively connected to the plunger, an outlet defined in the chamber and operatively connected to an inkjet printing nozzle, a plurality of inlets defined in the chamber and each being operatively connected to one of a plurality of ink supply reservoirs, and a linear controller having a control input provided to the linear actuator.

33. The apparatus of claim 32 wherein the actuator is a stepper motor and wherein the linear controller is operative to supply a signal that includes a number of step pulses to windings of the stepper motor.

34. The apparatus of claim 32 further including a gasket proximate a head of the plunger.

35. The apparatus of claim 32 further including a mixer operative to mix contents of the chamber.

36. The apparatus of claim 32 wherein the ink jet printing apparatus includes a plurality of chambers each responsive to a plurality of ink supply reservoirs.

37. The apparatus of claim 32 wherein the ink jet printing apparatus includes a mixing chamber for each of the following colors: cyan, magenta, yellow, and black.

38. The apparatus of claim 37 wherein the ink jet printing apparatus further includes a mixing chamber for at least one further color.

39. The apparatus of claim 32 further including a dilution fluid chamber having an output orifice and wherein the mixing chamber is also operatively connected to the dilution fluid chamber.

40. The apparatus of claim 32 wherein the linear controller is responsive to an ink recipe database.

41. A method of printing an inkjet proof of a document to be printed with a half-tone reference printer that uses one of three or more different inks with each of a number of different plates produced by a setter based an effective horizontal image cell pitch and an effective vertical image cell pitch, the method comprising:

receiving print data that describes half-tone dots having a predetermined perimeter using image cells at substantially the same horizontal image cell pitch and substantially the same vertical image cell pitch that is used by the setter to create the plates for the reference printer for the four or more colors, receiving predetermined amounts of a plurality of inks from a plurality of ink reservoirs to define a first mixed inkjet ink of a predetermined color, receiving predetermined amounts of a plurality of inks from a plurality of ink reservoirs to define a second mixed ink-jet ink of a predetermined color, receiving predetermined amounts of a plurality of inks from a plurality of ink reservoirs to define a third mixed ink-jet ink of a predetermined color, receiving a proofing sheet including a first rectangular deposited ink drop printable face having a periphery defined by an ordered series of first, second, third, and fourth edges of the proofing sheet, and including a second rectangular face opposite the first face and also having a periphery being defined by the first, second, third, and fourth edges of the imposition proofing print sheet, with at least the first face having properties resulting from a deposited ink drop print-enhancing treatment, and generating a halftone proof by depositing the first, second, and third mixed inks on at least the first face of the proofing sheet at substantially the same horizontal cell pitch as the effective horizontal cell pitch of the data received in the step of receiving and at substantially the same vertical cell pitch as the effective vertical cell pitch of the data received in the step of receiving.

42. The method of claim 41 wherein the steps of receiving are specified to match inks to be used on a reference printer.

43. The method of claim 41 further including the step of receiving predetermined amounts of a plurality of inks from a plurality of ink reservoirs to define a fourth mixed ink-jet ink of a predetermined color, and wherein the step of generating generates a halftone proof by further depositing the fourth mixed ink.

44. The method of claim 41 wherein the first, second, and third inks are cyan, magenta, and yellow inks, respectively.

45. An inkjet proofer for printing an inkjet proof of a document to be printed with a half-tone reference printer that uses one of four or more different inks with each of a number of different plates produced by a setter based an effective horizontal image cell pitch and an effective vertical image cell pitch, the proofer comprising:

a first reservoir for a first ink of a predetermined color, a second reservoir for a second ink of a predetermined color, a third reservoir for a third ink of a predetermined color, a mixing chamber responsive to the first, second, and third reservoirs, and logic for generating a halftone proof by depositing the first, second, third, and fourth mixed inks on at least the first face of a proofing sheet at substantially the same horizontal cell pitch as the effective horizontal cell pitch of the data for the reference printer and at substantially the same vertical cell pitch as the effective vertical cell pitch of the data for the reference printer.

46. The apparatus of claim 45 wherein the first, second, and third colors are: cyan, magenta, and yellow.

47. The apparatus of claim 45 further including a dilution fluid chamber having an output orifice and wherein the mixing chamber is also responsive to the dilution fluid chamber.

48. An inkjet proofer for printing an inkjet proof of a document to be printed with a half-tone reference printer that uses one of four or more different inks with each of a number of different plates produced by a setter based an effective horizontal image cell pitch and an effective vertical image cell pitch, the proofer comprising:

means for receiving print data that describes half-tone dots having a predetermined perimeter using image cells at substantially the same horizontal image cell pitch and substantially the same vertical image cell pitch that is used by the setter to create the plates for the reference printer for the four or more colors, means for receiving predetermined amounts of a plurality of inks from a plurality of ink reservoirs to define a first mixed ink-jet ink of a predetermined color, means for receiving predetermined amounts of a plurality of inks from a plurality of ink reservoirs to define a second mixed ink-jet ink of a predetermined color, means for receiving predetermined amounts of a plurality of inks from a plurality of ink reservoirs to define a third mixed ink-jet ink of a predetermined color, means for receiving a proofing sheet including a first rectangular deposited ink drop printable face having a periphery defined by an ordered series of first, second, third, and fourth edges of the proofing sheet, and including a second rectangular face opposite the first face and also having a periphery being defined by the first, second, third, and fourth edges of the imposition proofing print sheet, with at least the first face having properties resulting from a deposited ink drop print-enhancing treatment, and means for generating a halftone proof by depositing the first, second, and third mixed inks on at least the first face of the proofing sheet at substantially the same horizontal cell pitch as the effective horizontal cell pitch of the data received by the means for receiving and at substantially the same vertical cell pitch as the effective vertical cell pitch of the data received in the step of receiving.

* * * * *